United States Patent [19]

Farquhar et al.

[11] 4,421,984

[45] Dec. 20, 1983

[54] FIRE AND EXPLOSION AND DETECTION SUPPRESSION

[75] Inventors: Robert L. Farquhar, Reading; David N. Ball, Langley, both of England

[73] Assignee: Graviner, Limited, England

[21] Appl. No.: 282,310

[22] Filed: Jul. 10, 1981

[30] Foreign Application Priority Data

Jul. 12, 1980 [GB] United Kingdom ................ 8022859

[51] Int. Cl.[3] ................................................ G01J 1/00

[52] U.S. Cl. .................................... 250/339; 250/342; 250/347

[58] Field of Search ............... 250/338, 339, 340, 342, 250/349; 340/578, 600

[56] References Cited

U.S. PATENT DOCUMENTS

| | | | |
|---|---|---|---|
| 3,825,754 | 7/1974 | Cinzori et al. | 250/338 |
| 3,859,520 | 1/1975 | Hertzberg et al. | 250/209 |
| 3,931,521 | 1/1976 | Cinzori | 250/339 |
| 4,101,767 | 7/1978 | Lennington et al. | 250/339 |
| 4,160,163 | 7/1979 | Naksuchi | 250/339 |
| 4,206,454 | 6/1980 | Schapira et al. | 340/578 |
| 4,220,857 | 9/1980 | Bright | 250/339 |

*Primary Examiner*—Janice A. Howell
*Attorney, Agent, or Firm*—John K. Williamson

[57] ABSTRACT

The invention is for discriminating between the fire or explosion of an ammunition round and the fire or explosion which may then take place in the object struck by the round, and for initiating suppression of the latter fire or explosion only. Short wavelength radiation detectors feed a ratio detector which produces a logical output dependent on whether or not the color temperature of an event being monitored is above or below a fixed value. If the event is an exploding round then this will take the color temperature above this fixed value. A threshold unit and a rate of rise unit produce logical outputs dependent on whether the magnitude and rate of rise of the output of one of these two detectors are above or below fixed values. An infra-red detector detects radiation at a wavelength characteristic of a fire in the object; its output rises relatively slowly. If this detector detects a fire at this wavelength, it enables an AND gate but the gate does not initiate fire suppression if the ratio unit indicates that the color temperature is above the fixed value, because this signifies that the event is an exploding round. Fire suppression cannot take place until after the color temperature has fallen (and after a fixed delay produced by a monostable). The threshold unit and the rate of rise unit provide protection against incorrect initiation of fire suppression in conditions when the exploding round does not produce a color temperature clearly in excess of the fixed value.

13 Claims, 8 Drawing Figures

FIRE AND EXPLOSION AND DETECTION SUPPRESSION

BACKGROUND OF THE INVENTION

The invention relates to fire and explosion detection systems and more specifically to systems which are able to discriminate between fires and explosions which need to be suppressed and those which do not.

The systems now to be described are particularly, though not exclusively, for use in situations where it is required to discriminate between the explosion of an ammunition round and a fire or explosion of combustible or explosive material which is set off by that round - so as to detect the fire or explosion set off by the round but not to detect that exploding round itself. In this way, the systems can initiate action so as to suppress the fire or explosion set off by the round, but not initiate such suppression action merely in response to the exploding round.

One particular application of the systems is for use in armoured personnel carriers or battle tanks which may be attacked by high energy anti-tank (H.E.A.T.) ammunition rounds. In such an application, the systems are arranged to respond to hydrocarbon fires (that is, fires involving the fuel carried by the vehicle) such as set off by an exploding H.E.A.T. round or set off by hot metal fragments produced from or by the round (or set off by other causes), but not to detect either the exploding H.E.A.T. round itself (even when it has passed through the vehicle's armour into the vehicle itself), or the secondary non-hydrocarbon fire which may be produced by a pyrophoric reaction of the H.E.A.T. round with the armour itself.

BRIEF SUMMARY OF THE INVENTION

According to the present invention, there is provided a system for discriminating between fires or explosions which need to be detected and those which do not, comprising first and second radiation detection means respectively arranged to sense the intensity of radiation in different narrow wavelength bands selected such that the ratio of the intensities gives an effective colour temperature measure of the radiation source, ratio means responsive to the outputs of the first and second detection means to produce a first detection signal indicating whether or not the said colour temperature is above a predetermined threshold, rate of rise means responsive to the output of either one of the first and second detection means to produce a second detection signal indicating whether or not the rate of rise of that detection means exceeds a predetermined threshold, third radiation detection means arranged to sense the intensity of radiation lying in a narrow wavelength band characteristic of fires or explosions to be detected, first threshold means responsive to the output from the third detection means to produce a third detection signal indicating whether or not the intensity of radiation received by the third detection means exceeds a predetermined threshold, and output means responsive to the first, second and third detection signals to determine from them whether or not to produce a control output indicating that the source of radiation is a fire or explosion that needs to be detected, the arrangement being such that the output means produces its control output only when, simultaneously, the following conditions exist, that is, the first detection signal indicates that the colour temperature is below the predetermined threshold, the second detection signal indicates that the rate of rise of the output of the relevant detection means is above the predetermined threshold and the third detection signal indicates that the intensity of the radiation received by the third detection means is above the predetermined threshold.

According to the present invention, there is also provided a system for discriminating between fires or explosions which need to be detected and those which do not, comprising first and second radiation detection means respectively arranged to sense the intensity of radiation in different narrow wavelength bands selected such that the ratio of the intensities is a measure of the colour temperature of the source of the radiation, ratio means for measuring the ratio of the outputs of the first and second detection means to produce a first detection signal indicating whether or not the said colour temperature is above a predetermined threshold, third radiation detection means substantially instantaneously responsive to the intensity of radiation lying in a narrow wavelength band characteristic of fires or explosions to be detected, first threshold means connected to receive the output of the third detection means and to produce a second detection signal indicating whether or not the intensity of the radiation received by the third detection means exceeds a predetermined threshold, rate of rise means connected to receive the output of the third detection means and to produce a third detection signal indicating whether or not the rate of rise of the intensity of the radiation received by the third detection means exceeds a predetermined threshold, and output means connected to receive the first, second and third detection signals and to produce a control output indicating that the source of radiation is a fire or explosion that needs to be detected only when, simultaneously, the following conditions exist, that is, the first detection signal indicates that the colour temperature is below the predetermined threshold, the second detection signal indicates that the radiation intensity is above the predetermined threshold, and the third detection signal indicates that the rate of rise of the radiation intensity is above the predetermined threshold.

According to the present invention, there is yet further provided a system for discriminating between fires or explosions which need to be detected and those which do not, comprising first and second radiation detection means respectively arranged to sense the intensity of radiation in different narrow wavelength bands selected such that the ratio of the intensities is a measure of the colour temperature of the source of the radiation, ratio means for measuring the ratio of the outputs of the first and second detection means to produce a first detection signal indicating whether or not the said colour temperature is above a predetermined threshold, third radiation detection means comprising radiation responsive means substantially instantaneously responsive to the intensity of radiation lying in a narrow wavelength band characteristic of fires or explosions to be detected in combination with means delaying the resultant output of the radiation responsive means in a predetermined manner, first threshold means connected to receive the output of the third detection means and to produce a second detection signal indicating whether or not the output of the third detection means exceeds a predetermined threshold, rate of rise means connected to receive the output of the third detection means and to produce a third detection signal indicating whether or not the rate of rise of the output of the third detection means exceeds a predetermined threshold, and output means connected to receive the first, second and third detection signals and to produce a control output indicating that the source of radiation is a fire or explosion that needs to be detected only when, simultaneously, the following conditions exist, that is, the first detection signal indicates that the colour temperature is below the predetermined threshold, the second detection signal indicates that the output of the third detection means is above the predetermined threshold and the third detection signal indicates that the rate of rise of the output of the third detection means is above the predetermined threshold.

DESCRIPTION OF THE DRAWINGS

Fire and explosion detection systems embodying the invention will now be described, by way of example only, with reference to the accompanying diagrammatic drawings in which.

DESCRIPTION OF THE PREFERRED EMBODIMENTS

Figure 1:
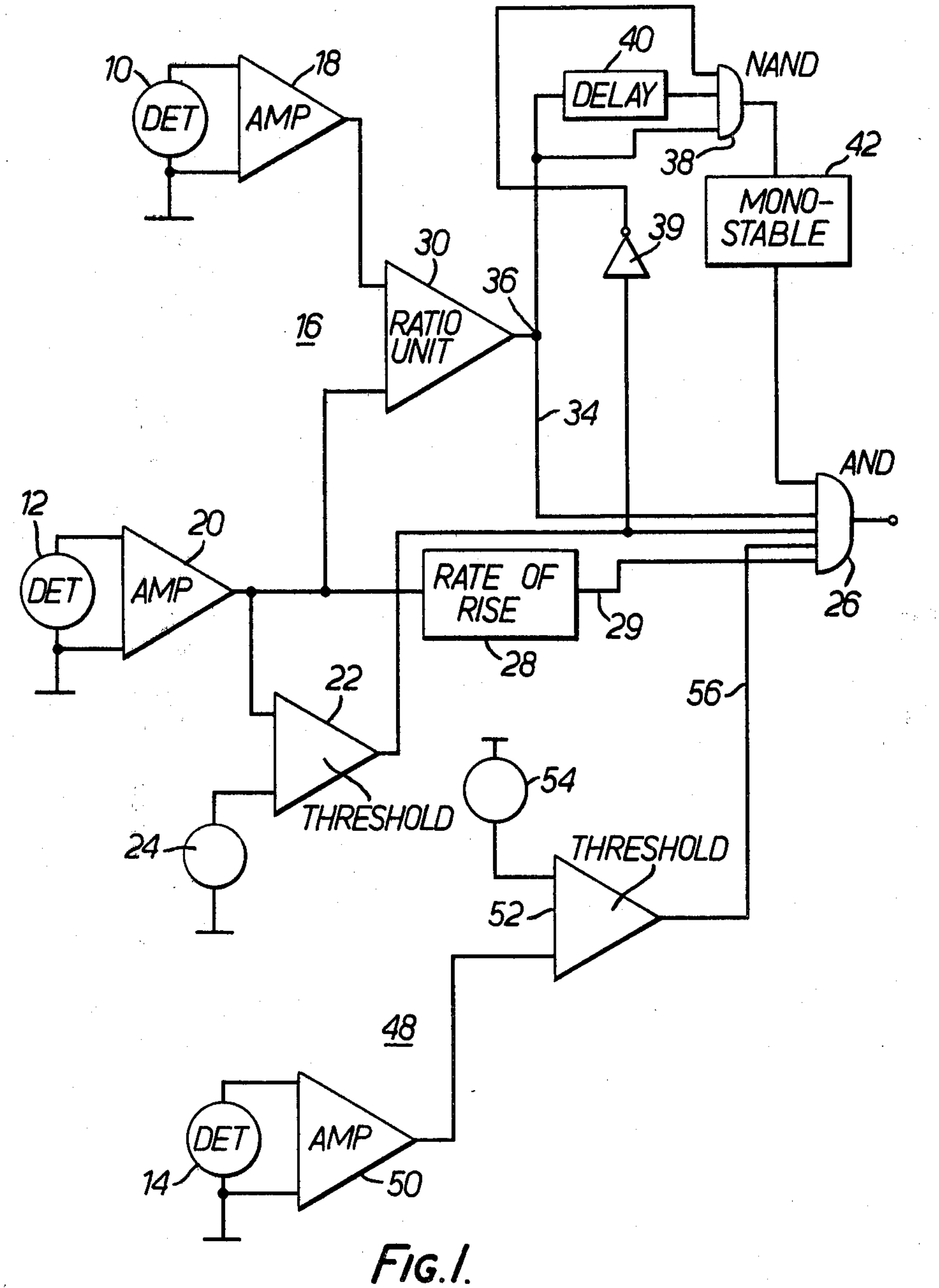
FIG. 1 is a block circuit diagram of one of the systems.

As shown in FIG. 1, one form of the system comprises three radiation detectors 10, 12 and 14, each of which produces an electrical output in response to radiation received. Detectors 10 and 12 are sensitive to radiation in narrow wavelength bands centered at 0.76 and 0.96 microns respectively. For example, the detectors 10 and 12 may each be a silicon diode detector arranged to view radiation through a filter transmitting radiation only within the required wavelength band. Detector 14 is arranged to be sensitive to radiation in a narrow wavelength band centered at 4.4 microns. The detector 14 is a thermopile sensor arranged to receive radiation through a filter having the required wavelength transmitting band.

Detectors 10 and 12 feed their electrical outputs into a channel 16 through amplifiers 18 and 20. In channel 16, amplifier 20 feed its output into one input of a threshold comparator 22 which compares it with a reference level from a reference source 24. The comparator changes its output from a "0" to a "1" when the level received from the amplifier 20 exceeds the threshold, and this output is fed to one input of an AND gate 26 by means of a line 27.

Amplifier 2 also feeds a rate of rise detecting circuit 28 which changes it binary output from "0" to "1" when the rate of rise of the signal from detector 12 exceeds a predetermined value. This binary output is fed to another input of the AND gate 26 on a line 29.

The output of amplifier 20 is also fed into one input of a ratio measuring circuit 30 whose other input receives the output of amplifier 18. The ratio unit 30 measures the ratio of the amplifier outputs and this is a measure of the colour temperature of the source of radiation to which the detectors 10 and 12 respond. The ratio unit 30 is set to produce a "0" output when the ratio measured is such as to indicate that the colour temperature of the source is above a predetermined value (2,500° K. in this example) and to produce a "1" binary output when the colour temperature is below this value. The binary output from a ratio unit 30 is fed to another input of the AND gate 26 via a line 34 connected to a point 36.

The point 36 also feeds a NAND gate 38 directly and through a delay circuit 40 having a predetermined delay of 10 milliseconds. Gate 38 has an additional input from threshold comparator 22 via an inverter 39. The input of gate 38 triggers a monostable 42. When triggered, the monostable changes its output from binary "1" to "0" and holds the latter output for a fixed longer period of for example 100 milliseconds (in this example). The binary output from the monstable feeds another input of the AND gate 26.

Detector 14 feeds a second channel 48. This channel comprises an amplifier 50 whose output feeds one input of a threshold comparator 52 which compares the level of the amplifier output with a predetermined level received from a reference source 54. The comparator 52 changes its binary output from "0" to "1" when the output of amplifier 50 exceeds the predetermined level and this binary output is fed to the final input of the AND gate 26 on a line 56.

AND gate 26 is connected (by means not shown) to fire suppression equipment which it activates when its output changes from "0" to "1".

The operation of the system will now be described in the three situations (referred to as Case I, Case II and Case III) explained in detail below.

Case I

This is the case where an H.E.A.T. round passes through the vehicle's armour and explodes but does not set off a hydrocarbon fire. Therefore, this is a case where the system is required not to initiate fire suppression.

FIG. 2A shows the outputs of the detectors 10, 12 and 14 (curves A, B and C respectively) for Case I. Time $t_1$ indicates the end of the 10 millisecond delay period of the delay circuit 40.

As shown in FIG. 2A, the outputs of the detectors 10 and 12 rise substantially instantaneously towards a maximum value. The output of the detector 14, however, rises much more slowly because of the thermal inertia of the thermopile.

Curve D of FIG. 2B shows the colour temperature as measured by the ratio 30, the predetermined colour temperature value (of 2,500° K. in this example) being indicated by the dotted line U. While curve D is above U, therefore, the ratio unit 30 produces a "0" output.

In FIG. 2A, $I_1$ and $I_2$ indicate the threshold levels set by the reference units 24 and 54. Therefore, almost immediately, the output of amplifier 20 (FIG. 1) will exceed the relatively low threshold $I_1$ of the threshold unit 22 and the latter will therefore feed a "1" output to AND gate 26. In channel 48, however, the output of threshold unit 52 does not go to "1" until a time $t_4$ (see FIG. 2A), because of the relatively slow rate of rise of the output of detector 14.

FIG. 2B shows that the output of the ratio unit 30 will be "0" up to time $t_2$ and the AND gate 26 will therefore receive a "0" on line 34.

During the period before $t_1$ monostable 42 will hold its output at "1".

Initially, the rate of rise circuit 28 will produce a "1" output on line 29 because of the rapid rise of output from detector 12 but this will change to "0" at a time $t_3$ (FIG. 2A).

The overall result of all these conditions is that AND gate 26 cannot produce a "1" output, and therefore fire suppression does not take place. Thus, for the whole of the period until $t_2$, the colour temperature exceeds the predetermined limit and the ratio unit 30 will therefore be producing a "0" output which will be fed to AND gate 26 on lines 33 and 34. Then, at time $t_1$, NAND gate 38 will be enabled and will produce a "1" output which will trigger the monostable 40 to produce a resultant "0" output which will therefore prevent AND gate 26 from producing a "1" output for a further 100 milliseconds by which time the explosion of the H.E.A.T. round will have dissipated.

Furthermore, until time $t_4$, threshold unit 52 will be feeding a "0" output to AND gate 26. Finally, from time $t_3$ onwards, the rate of rise unit 28 will be producing a "0" output.

The effect of threshold unit 52 and the rate of rise detector 28 is that one or other of them is always producing a "0" output, and this positively prevents fire suppression taking place even if, for some reason, the ratio unit 30 should fail to produce or maintain its "0" output for the whole of this period. With certain types of armour, the colour temperature produced by an exploding H.E.A.T. round may only slightly exceed the predetermined limit and there may, therefore, be a possibility that the ratio unit 30 does not maintain its "0" output for the required length of time. False fire suppression is, however, prevented in the manner explained.

Case II

This is the case where an H.E.A.T. round hits the fuel tank of the vehicle and causes an explosive fire. In such a case, the H.E.A.T. round explodes inside the fuel tank and the resultant explosion of the H.E.A.T. round itself is "quenched" and the intensity of the radiation which it emits is reduced as compared with Case I. In FIGS. 3A and 3B, the hydrocarbon fire is assumed to start at time $t_5$.

FIGS. 3A and 3B correspond to FIGS. 2A and 2B and explain the operation of the system, and values in FIGS. 3A and 3B corresponding to those in FIGS. 2A and 2B are similarly referenced.

As the exploding H.E.A.T. round is quenched in the manner described, the colour temperature of the radiation sensed by the detectors will be less than 2,500° K. (as shown in FIG. 3B) and the ratio unit 30 (FIG. 1) will therefore continuously produce a "1" output on line 34. Furthermore, the monostable 40 will not be tripped and it will apply a "1" output to the AND gate 26.

In addition, the threshold unit 22 will feed a "1" output to the AND gate 26.

Almost immediately the explosion occurs, the rate of rise unit 28 will detect a rate of rise signal greater than its reference value and will therefore produce a "1" output to the AND gate 26.

However, initially the output from detector 14 will not be sufficient to switch the output of the threshold unit 52 from "0" to "1".

Therefore, the output of the AND gate 26 will remain at "0" and fire suppression will not be initiated.

At time $t_4$, the output of the threshold unit 52 will change from "0" to "1". However, AND gate 26 will still not produce a "1" output because by this time the output of detector 12 (curve B) is falling, and the rate of rise unit 28 will now produce a "0" output. Therefore, fire suppression still does not take place.

At time $t_5$, however, the hydrocarbon fire now starts and this will cause the output of detectors 10 and 12 to begin to increase again. Therefore, the rate of rise unit 28 wll switch its output from "0" to "1". Since at this time the threshold unit 52 will also be producing a "1" output, the AND gate 26 will have all its inputs set at "1" and it will therefore produce a "1" output to initiate fire suppression.

Case III

This is the case where the H.E.A.T. round explodes in conditions in which its radiation is partially "quenched", such as, for example, exploding in the ullage space of the fuel tank of the vehicle. This situation is illustrated in FIGS. 4A and 4B in which values corresponding to those in the other Figures are correspondingly referenced.

Initially, operation is as described above with reference to FIGS. 2A and 2B. The colour temperature is above 2,500° K., and the ratio unit 30 therefore produces a "0" output. Similarly, up to time $t_4$, the threshold unit 52 is producing a "0" output and after time $t_3$ the rate of rise unit 52 is producing a "0" output. Therefore, fire suppression does not take place.

However, because of the partial quenching of the exploding H.E.A.T. round, at time $t_2$, the colour temperature has fallen below the predetermined limit, and the output of ratio unit 30 switches from "0" to "1". The "0" output from the rate of rise unit 52 still prevents fire suppression taking place, but (unlike Case I) the monostable 40 is not triggered and its output remains at "1".

This means, therefore, that at time $t_5$, when the hydrocarbon fire starts, fire suppression can be initiated in the manner explained above under Case II.

In a modification of the system of FIG. 1, detector 14 is a detector which reacts substantially more rapidly to radiation than a thermopile-type detector. For example, the detector 14 could be a lead selenide detector arranged to view radiation through a filter transmitting radiation only in a narrow wavelength band centred at 4.4 microns. In addition, however, the system has a signal shaping circuit between the output of the amplifier 58 and the input of the threshold circuit 52. This shaping circuit would have the effect of producing an input to the threshold unit 52 substantially of the same shape as shown in FIGS. 2A, 3A and 4A. The operation of the system would therefore be as already described. The advantage of this modification is that the shape of the input signal to the threshold unit 52 would be more controllable and predictable (because it would depend on the characteristics of the added shaping circuit) than is the case for the system shown in FIG. 1 where the shape of the curve is somewhat indeterminate, being dependent on the thermal characteristics of the thermopile.

A further modification of the system of FIG. 1 involved the use of the rapid-response detector for detector 14, for example a lead selenide detector and 4.4 micron filter referred to above, but this time not including the additional shaping circuit connected to the output of amplifier 50. The effect of this is illustrated in FIGS. 2A, 3A and 4A by the curve E1 which, for this modification, replaces curve C, and shows how the signal applied to the input of the threshold unit 52 now rises very rapidly.

Figure 2:
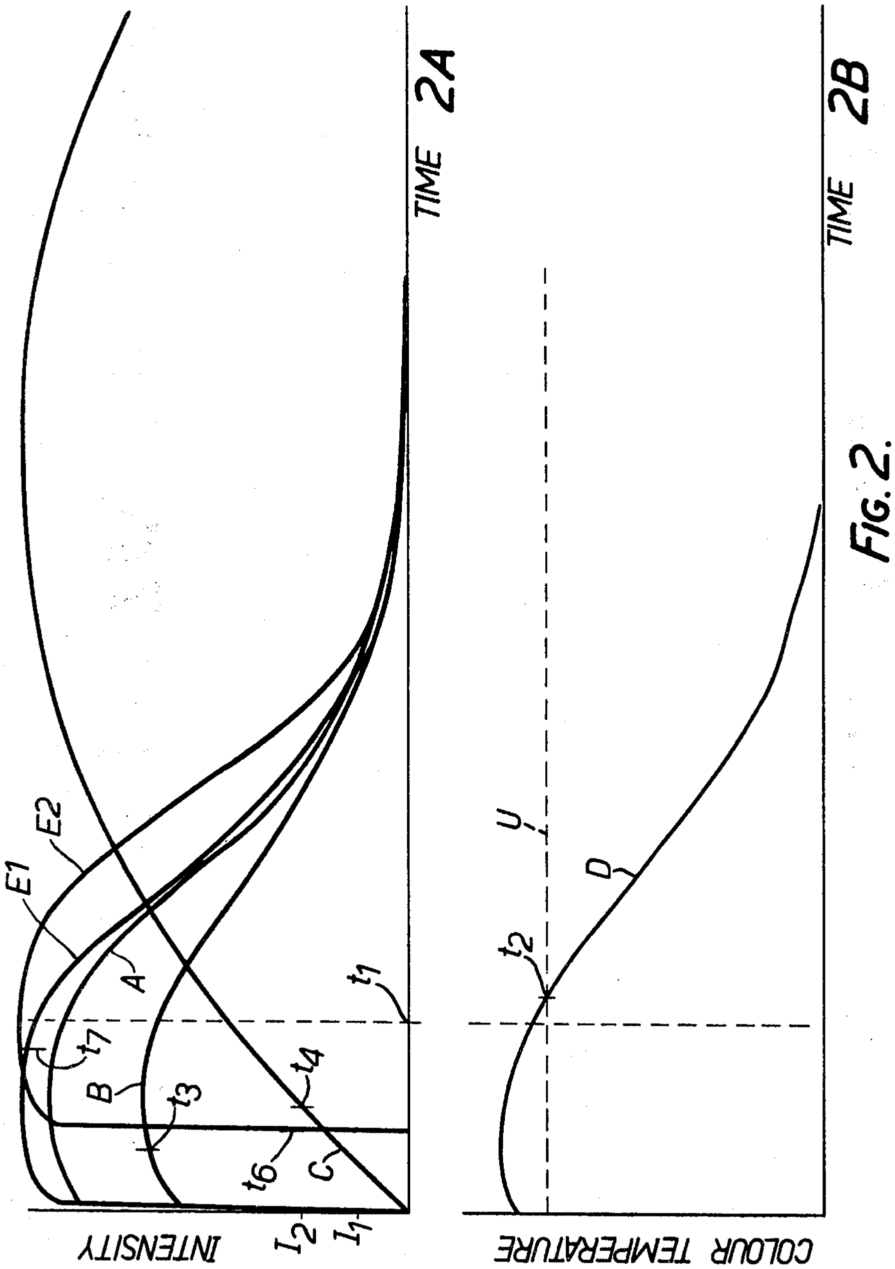
FIG. 2A is a graph of relative signal output for detectors operating at different wavelengths against time for a fire or explosion not to be detected.
FIG. 2B is a graph of colour temperature against time of a fire or explosion not to be detected.
Figure 3:
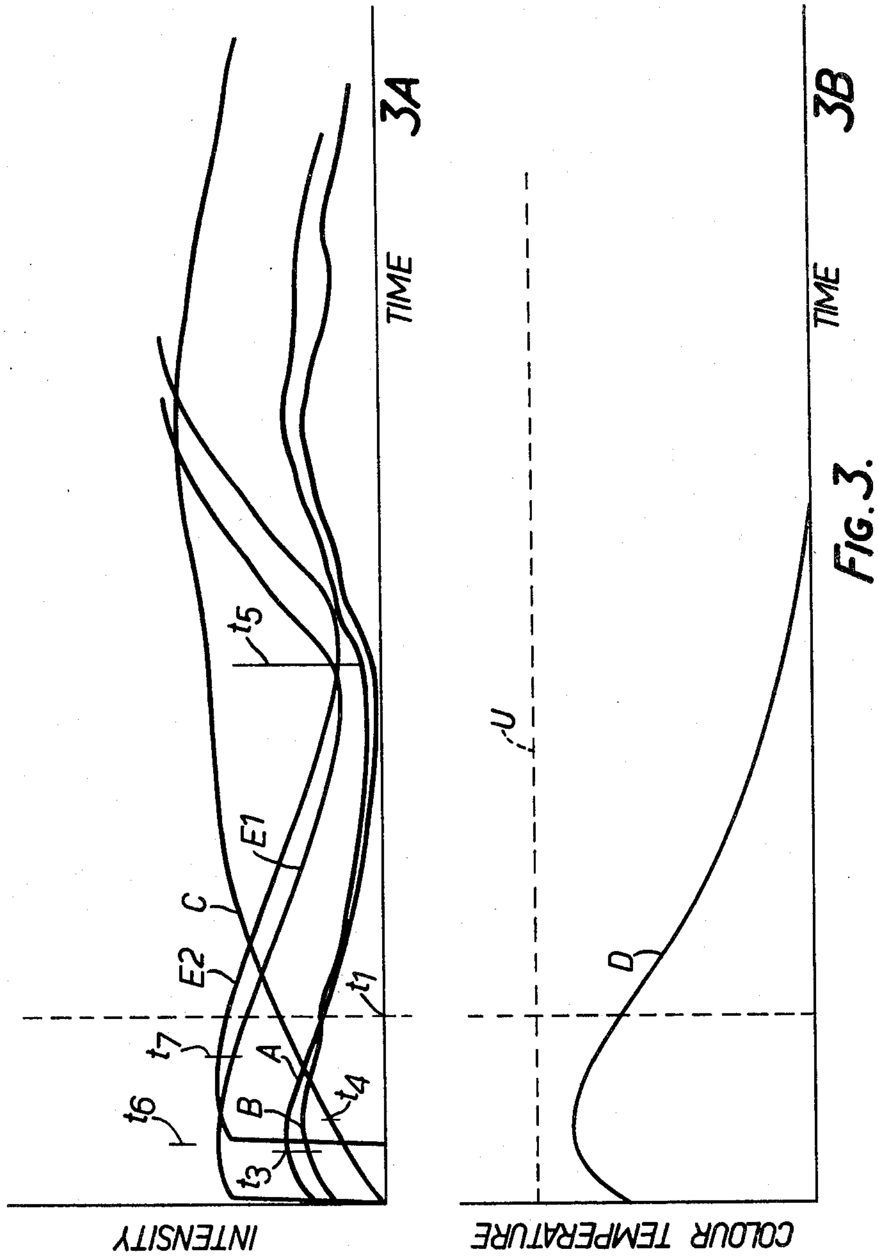
FIGS. 3A and 3B correspond respectively to FIGS. 2A and 2B but are in respect of a different fire or explosion, this time one to be detected.
Figure 4:
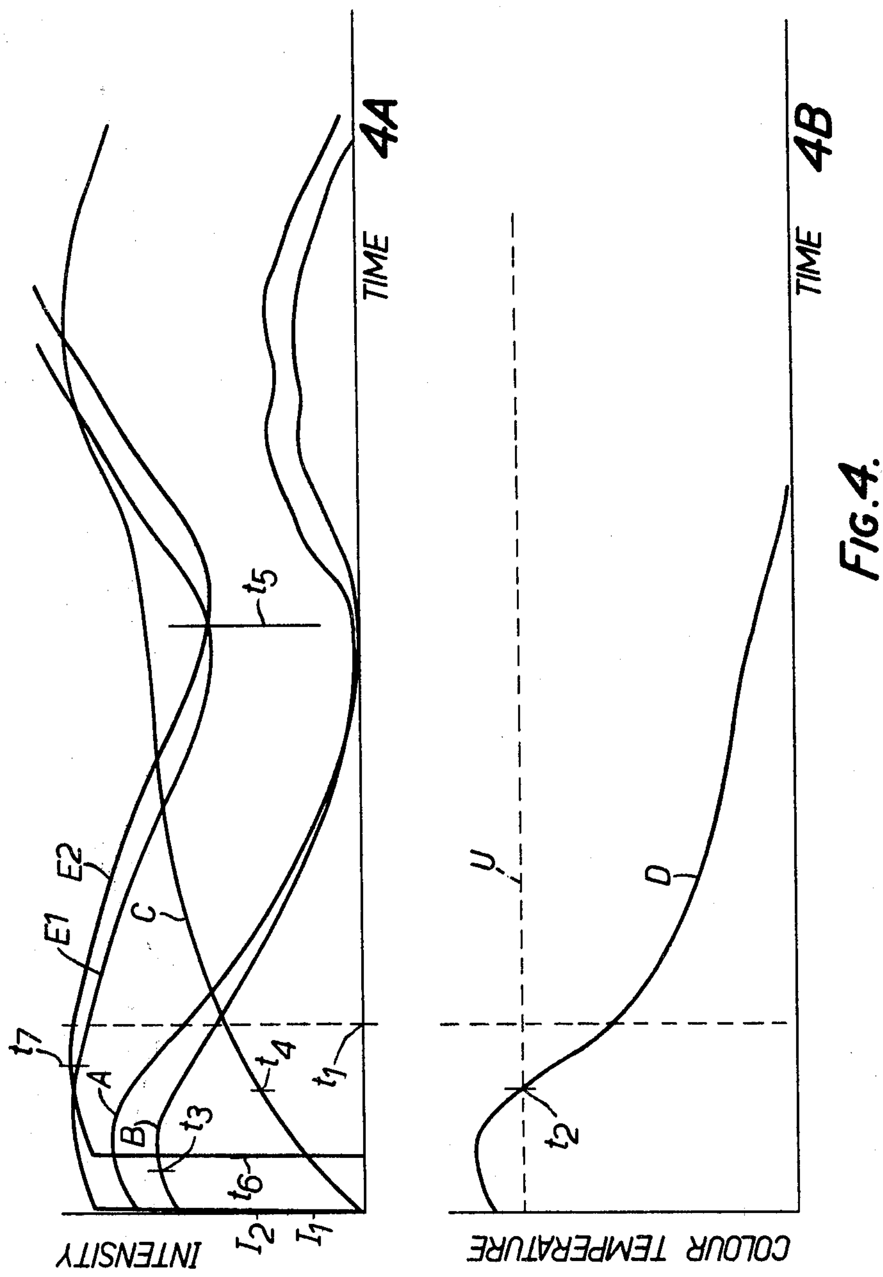
FIGS. 4A and 4B correspond respectively to FIGS. 3A to 3B and are in respect of another fire or explosion to be detected.

The operation of such a modified system will now be described with reference to FIGS. 2, 3 and 4 and also with reference to Case I, Case II and Case III as defined above.

Case I

FIGS. 2A and 2B apply to this case.

While the colour temperature as measured by detectors 10 and 12 is above the predetermined limit (until time $t_2$), the ratio unit 30 will produce a "0" output. Up to time $t_3$, all other inputs to the AND gate 26 will be at "1" but of course the "0" output from the ratio unit 30 will prevent the AND gate 26 from initiating fire suppression action. After time $t_3$, the output of the rate of rise detector 28 will change to "0" and provide additional protection against fire suppression.

At time $t_1$, NAND gate 38 will receive three "0" inputs and the monostable 40 will therefore change its output to "0" and positively prevent fire suppression for a further 100 milliseconds.

This modification therefore differs from the basic system described with reference to FIG. 1 in that initial inhibition of fire suppression is provided solely by the "0" output of the ratio unit 30.

Case II

FIGS. 3A and 3B apply.

In this case, the ratio unit 30 will determine that the colour temperature is below the predetermined limit and will therefore produce a "1" output. Because of the very rapid rise of curve E1 (as well as that of curves A and B), all other inputs to the AND gate 26 will be at "1" and fire suppression will be therefore initiated almost immediately. After time $t_3$, of course, the rate of rise detector unit 28 will switch to a "0" output, but by this time fire suppression action will have been initiated.

This modification therefore differs from the basic system described with reference to FIG. 1 in that fire suppression takes place almost immediately instead of at time $t_5$.

Case III

FIGS. 4A and 4B apply.

Here, fire suppression will be prevented initially because the ratio unit 30 will determine that the colour temperature is above the predetermined limit and will thus produce a "0" output.

At time $t_2$, the colour temperature will fall below the predetermined limit and ratio unit 30 will therefore switch to a "1" output. If this occurs before time $t_3$ fire suppression will be initiated because all other inputs of the AND gate 26 will be at "1". If, however, time $t_2$ occurs after time $t_3$, (as assumed in FIG. 4A), then fire suppression will not be initiated because by this time the output of unit 28 will have switched to "0". In that case, therefore, fire suppression will not take place until time $t_5$.

In another modification of the system of FIG. 1, detector 14 is again a detector which reacts substantially more rapidly to radiation than a thermopile-type detector; again, for example, detector 14 could be a lead selenide detector arranged to view radiation through a filter transmitting radiation only in a narrow wavelength band centred at 4.4 microns. This time, however, the system has a delay circuit (as opposed to the signal shaping circuit discussed above) between the output of amplifier 50 and the input of the threshold circuit 52. The effect of this is illustrated in FIGS. 2A, 3A and 4A by the curve E2 which, for this modification, replaces curve C, and corresponds to the curve E1 discussed above but is of course delayed in time.

The operation of such a modified system will now be described with reference to FIGS. 2, 3, and 4 and also with reference to Case I, Case II and Case III as defined above.

Case I

FIGS. 2A and 2B apply to this Case.

While the colour temperature as measured by detectors 10 and 12 is above the predetermined limit (until time $t_2$), the ratio unit 30 will produce a "0" output. In addition, up to time $t_6$ the output of the threshold unit 52 will be "0" because of the effect of the delayed output from the detector 14. Up to time $t_3$, the other inputs to the AND gate 26 will be at "1" but the gate will be prevented from initiating fire suppression action both by the "0" output from the ratio unit 30 and the "0" from the threshold unit 52. After time $t_3$, the output of the rate of rise detector 28 will change to "0" and provide additional protection against fire suppression.

At time $t_1$, NAND gate 38 will receive three "0" inputs and the monostable 40 will therefore change its output to "0" and positively prevent fire suppression for a further 100 milliseconds.

Therefore, initial inhibition of fire suppression in this modification is provided not only by the "0" output of the ratio unit 30 but also by the "0" output of the threshold unit 52 which is maintained until time $t_6$.

Case II

FIGS. 3A and 3B apply.

In this case, the ratio unit 30 will determine that the colour temperature is below the predetermined limit and will therefore produce a "1" output. Up to time $t_6$, curve E2 shows that the output of the threshold unit 52 will be at "0". All other inputs to the AND gate 26 will be at "1", but the "0" output of threshold unit 52 will prevent immediate initiation of fire suppression. After time $t_2$, the rate of rise detector 28 will switch to a "0" output and the fire suppression will therefore continue to be prevented, even though by this time the output of the threshold unit 52 will have gone to "1".

Fire suppression will therefore not be initiated until time $t_5$.

Case III

FIGS. 4A and 4B apply.

Here, fire suppression will be prevented initially because the ratio unit will determine that the colour temperature is above the predetermined limit and will thus produce a "0" output, and, additionally, curve E2 shows that the threshold unit 52 will produce a "0" output until time $t_6$.

At time $t_2$, the colour temperature will fall below the predetermined limit and ratio unit 30 will therefore switch to a "1" output. Even if this occurs before time $t_3$, fire suppression will not be initiated because the threshold unit 52 is still producing a "0" output until time $t_6$, and after time $t_6$, the output of the unit 28 will have switched to "0". Therefore, fire suppression will not be initiated until time $t_5$.

Figure 5:
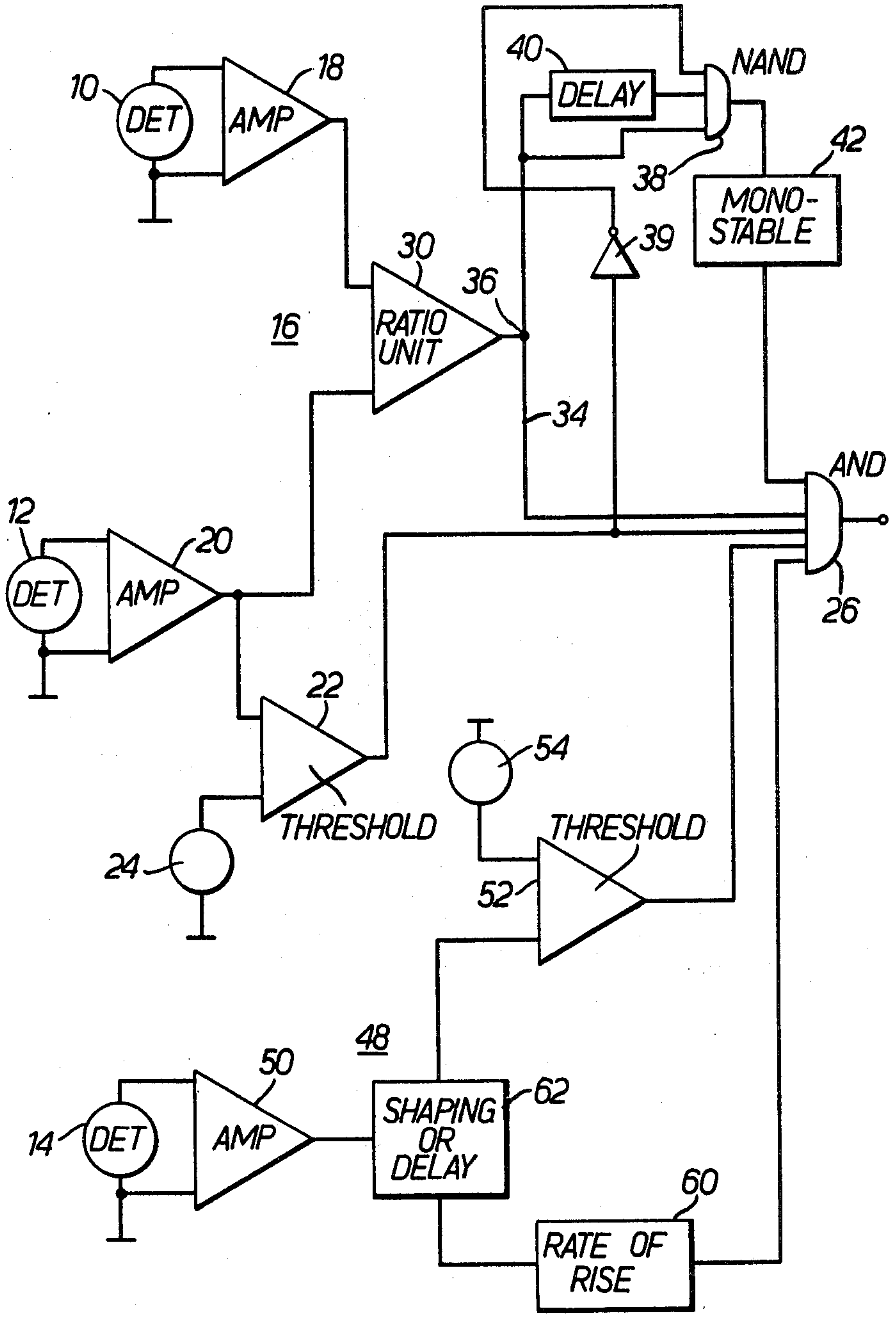
FIG. 5 is a block circuit diagram of another of the systems.

FIG. 5 shows a further modification. Items in FIG. 5 corresponding to those in FIG. 1 are similarly referenced.

The system of FIG. 5 differs from that of FIG. 1 in that the rate of rise unit 28 in channel 16 is deleted, and a rate of rise unit 60 is incorporated in channel 48. In addition, FIG. 5 shows the signal shaping circuit (circuit 62) in channel 48 and connected to the output of amplifier 50. As suggested above, detector 14 is, instead of the thermopile detector mentioned in conjuction with FIG. 1, a detector reacting substantially instantaneously to receive radiation, such as a lead selenide detector receiving radiation through a filter having a narrow wavelength band centred at 4.4 microns.

The effect of the use of a lead selenide detector as the detector 14, in conjunction with the shaping circuit 62, is that the output signal fed into the threshold unit 52 and the rate of rise unit 60 has the same general shape as curve C in FIGS. 2A and 3A.

The operation of the system of FIG. 5 will now be described with reference to FIGS. 2, 3 and 4 and with reference to Case I, Case II and Case III as defined above.

Case I

The waveforms of FIGS. 2A and 2B apply here.

Until time $t_2$, the colour temperature of the exploding H.E.A.T. round will be above the predetermined limit, and the ratio unit 30 will therefore produce a "0" output. After time $t_4$, however, all other inputs of the AND gate 26 will be at "1", because, in contrast to the system of FIG. 1, the rate of rise unit (unit 60) is now responding to curve C. Nevertheless, because AND gate 26 has one "0" input, fire suppression does not take place.

At time $t_1$, the output of delay circuit 40 will cause NAND gate 38 to trigger the monosable 41 and feed a "0" input to AND gate 26 for the 100 millisecond period. This will therefore prevent fire suppression for this 100 millisecond period in the manner already explained.

Therefore, the system of FIG. 5 depends (for inhibition of fire suppression) solely on the detection by channel 16 of the high colour temperature of the exploding H.E.A.T. round.

Case II

After time $t_4$ (FIGS. 3A and 3B), all inputs to the AND gate 26 will be at the "1" level and therefore there will be early fire suppression action. The system thus differs from the basic system described with reference to FIG. 1 where fire suppression was delayed until time $t_5$.

Case III

Here, FIGS. 4A and 4B apply.

Initially fire suppression will be prevented by the "0" output from the ratio unit 30. At time $t_2$, however, the colour temperature of the partially quenched H.E.A.T. round will fall below 2,500° K. and the output of the ratio unit 30 will switch from "0" to "1", and fire suppression will then be initiated. Again, therefore, the system of FIG. 5 differs from the basic system described with reference to FIG. 1 in that fire suppression occurs earlier.

The system of FIG. 5 can be modified by deleting the signal shaping circuit 62. The operation of such a system will now be considered with reference to FIGS. 2 to 4. Because the circuit 62 has been deleted, curve E1, rather than curve C, applies.

Case I

FIGS. 2A and 2B apply.

While ratio unit 30 detects that the colour temperature is above the predetermined limit, it will produce a "0" output which will prevent fire suppression by the AND gate 26, even though all other inputs to the AND gate will be at "1". Like the basic FIG. 5 system, therefore, this system depends for inhibition of fire suppression on the detection of the colour temperature by the ratio unit 30.

At time $t_1$, NAND gate 38 will receive three "0" inputs and will trigger the monostable 42 to switch to a "0" output and will therefore prevent fire suppression for a further fixed period of 100 milliseconds.

Case II

Here, FIGS. 3A and 3B apply.

In this case, almost immediately all inputs to the AND gate 26 will go to "1" because the ratio unit 30 will determine that the colour temperature is below the predetermined limit. Fire suppression will therefore take place almost immediately.

Case III

In this case (FIGS. 4A and 4B), the ratio unit 30 will determine that the colour temperature is above the predetermined limit and will therefore produce a "0" output. Although all other inputs to the AND gate 26 will be at "1", fire suppression will therefore be inhibited. At time $t_2$, however, the colour temperature will fall below the predetermined limit and the output of ratio unit 30 will switch to "1". If time $t_2$ occurs before time $t_3$, all inputs of the AND gate 26 will be at "1" and fire suppression will be initiated. If time $t_2$ occurs after time $t_3$ (as assumed in FIG. 4A), then fire suppression will be prevented by the "0" output of the rate of rise unit 60 and fire suppression will not take place until time $t_5$.

A further possible modification to the system of FIG. 5 involves the replacement of the signal shaping circuit 62 by a simple delay circuit. The operation of such a system will now be considered with reference to FIGS. 2 to 4, and the Cases defined above. Because circuit 62 is now a simple delay circuit, curve E2 rather than E1 or curve C, applies.

Case I

FIGS. 2A and 2B apply.

While ratio unit 30 detects that the colour temperature is above the predetermined limit, it will produce a "0" output, that is, until time $t_2$. Until time $t_6$, threshold unit 52 will also produce a "0" ouput, as will the rate of rise unit 60. Therefore, AND gate 26 cannot initiate fire suppression, and unlike the basic FIG. 5 system, therefore, this system does not depend for initial inhibition of fire suppression solely on the detection of the colour temperature by the ratio unit 30.

Between times $t_6$ and $t_7$, the inhibition of fire suppression does not depend on the "0" output of the ratio unit 30. After time $t_7$, however, the rate of rise unit 60 now switches back to "0" and provides further protection against initiation of fire suppression.

At time $t_1$, NAND gate 38 will receive there "0" inputs and will trigger the monostable 42 to switch to a "0" output and will therefore prevent fire suppression for a further fixed period of 100 milliseconds.

Case II

Here, FIGS. 3A and 3B apply.

Ratio unit 30 will determine that the colour temperature is below the predetermined limit. However, fire suppression will be prevented because the delay circuit 62 will ensure that both the threshold unit 52 and the rate of rise unit 60 produce "0" outputs. After time $t_6$, however, both of these units switch to "1" outputs and fire suppression is initiated.

Case III

In this case (FIGS. 4A and 4B), the ratio unit 30 will initially determine that the colour temperature is above the predetermined limit and will therefore produce a "0" output. In addition, both the threshold unit 52 and the rate of rise unit 60 will produce "0" outputs, and fire suppression will therefore be inhibited. At time $t_2$, however, the colour temperature will fall below the predetermined limit and the output of ratio unit 30 will switch to "1". If time $t_2$ occurs before time $t_6$, the "0" outputs from the threshold unit 52 and the rate of rise unit 60 will still prevent fire suppression, which will therefore not occur until time $t_6$. If time $t_2$ occurs after time $t_6$ but before time $t_7$, then all inputs of the AND gate 26 will be at "1", and fire suppression will be initiated immediately. Finally, if time $t_2$ occurs after time $t_7$, fire suppression will be prevented by the "0" output of the rate of rise unit 60 and fire suppression will not take place until time $t_5$.

In the foregoing modification to the system of FIG. 5, the circuit 62, in the form of a simple delay circuit, was connected as shown in FIG. 5. However, instead it could be connected between amplifier 20 and threshold unit 22 in channel 16.

The circuit of FIG. 5 can also be modified by feeding the rate of rise unit 60 directly from the amplifier 50 (instead of via the shaping or delay circuit 62), but still continuing to feed the threshold unit 52 from the circuit 62.

What is claimed:

1. A system for discriminating between fires or explosions which need to be detected and those which do not, comprising first and second radiation detection means respectively arranged to sense the intensity of radiation in different narrow wavelength bands which are selected such that their intensities have a ratio which gives an effective color temperature measure of the radiation source, ratio means responsive to the outputs of the first and second detection means to produce a first detection signal indicating whether or not the said color temperature is above a predetermined color temperature threshold, rate of rise means responsive to the output of one of the first and second detection means to produce a second detection signal indicating whether or not the rate of rise of said one detection means exceeds a predetermined rate of rise threshold, third radiation detection means arranged to sense the intensity of radiation lying in a narrow wavelength band characteristic of fires or explosions to be detected, first threshold means responsive to the output from the third detection means to produce a third detection signal indicating whether or not the intensity of radiation received by the third detection means exceeds a predetermined intensity threshold, and output means responsive to the first, second and third detection signals to determine from them whether or not to produce a control output indicating that the source of radiation is a fire or explosion that needs to be detected, the system being arranged such that said output means produces its control output only when, simultaneously, the following conditions exist, that is, the first detection signal indicates that the color temperature is below the predetermined color temperature threshold, the second detection signal indicates that the rate of rise of the output of said one detection means is above the predetermined rate of rise threshold and the third detection signal indicates that the intensity of the radiation received by the third detection means is above the predetermined intensity threshold.

2. A system according to claim 1, including second threshold means responsive to the output of a preselected one of the first and second detection means to produce a fourth detection signal indicating whether or not the output of that detection means is above a second predetermined intensity threshold which corresponds to a lower intensity of radiation than does the first-mentioned predetermined intensity threshold, and in which the output means only produces the said control output when, simultaneously with the said conditions, the second threshold means indicates that the output of said preselected detection means is above the second predetermined intensity threshold.

3. A system according to claim 1, in which the third detection means is arranged such that its output is integrated in time with respect to the intensity of the radiation which it receives.

4. A system according to claim 3, in which the third detection means comprises a radiation detector having thermal inertia.

5. A system according to claim 4, in which the third detection means is a thermopile-type detector.

6. A system according to claim 3, in which the third detection means is a photoelectric-type detector and a signal shaping circuit receiving and delaying the output thereof.

7. A system for discriminating between fires or explosions which need to be detected and those which do not, comprising first and second radiation detection means respectively arranged to sense the intensity of radiation in different narrow wavelength bands which are selected such that their intensities have a ratio which is a measure of the color temperature of the source of radiation, ratio means for measuring the ratio of the outputs of the first and second detection means to produce a first detection signal indicating whether or not the said color temperature is above a predetermined color temperature threshold, third radiation detection means responsive without delay to the intensity of radiation lying in a narrow wavelength band characteristic of fires or explosions to be detected, first threshold means connected to receive the output of the third detection means and to produce a second detection signal indicating whether or not the intensity of the radiation received by the third detection means exceeds a predetermined intensity threshold, rate of rise means connected to receive the output of the third detection means and to produce a third detection signal indicating whether or not the rate of rise of the intensity of the radiation received by the third detection means exceeds a predetermined rate of rise threshold, and output means connected to receive the first, second and third detection signals and to a produce a control output indicating that the source of radiation is a fire or explosion that needs to be detected only when, simultaneously, the following conditions exist, that is, the first detection signal indicates that the color temperature is below the predetermined color temperature threshold, the second detection signal indicates that the radiation intensity is above the predetermined intensity threshold, and the third detection signal indicates that the rate of rise of the radiation intensity is above the predetermined rate of rise threshold.

8. A system according to claim 7, including second threshold means connected to receive the output of one of the first and second detection means and to produce a fourth detection signal indicating whether or not the intensity of the radiation received by said one detection means is above a second predetermined intensity threshold which is lower than the first-mentioned predetermined intensity threshold, and in which the output means is connected to receive the fourth detection signal and is operative to produce the said control signal only when, simultaneously with the said conditions, the fourth detection signal indicates that the intensity of the radiation received by said one detection means exceeds the second predetermined intensity threshold.

9. A system according to claim 8, in which the third detection means is a photoelectric-type detector.

10. A system for discriminating between fires or explosions which need to be detected and those which do not, comprising first and second radiation detection means respectively arranged to sense the intensity of radiation in different narrow wavelength bands which are selected such that their intensities have a ratio which is a measure of the color temperature of the source of the radiation, ratio means for measuring the ratio of the outputs of the first and second detection means to produce a first detection signal indicating whether or not the said color temperature is above a predetermined color temperature threshold, third radiation detection means comprising radiation responsive means responsive without delay to the intensity of radiation lying in a narrow wavelength band characteristic of fires or explosions to be detected and to produce an output accordingly, in combination with means delaying the output of the radiation responsive means in a predetermined manner, first threshold means connected to receive the output of the third detection means and to produce a second detection signal indicating whether or not the output of the third detection means exceeds a predetermined intensity threshold, rate of rise means connected to receive the output of the third detection means and to produce a third detection signal indicating whether or not the rate of rise of the output of the third detection means exceeds a predetermined rate of rise threshold, and output means connected to receive the first, second and third detection signals and to produce a control output indicating that the source of radiation is a fire or explosion that needs to be detected only when, simultaneously, the following conditions exist, that is, the first detection signal indicates that the color temperature is below the predetermined color temperature threshold, the second detection signal indicates that the output of the third detection means is above the predetermined intensity threshold and the third detection signal indicates that the rate of rise of the output of the third detection means is above the predetermined rate of rise threshold.

11. A system according to claim 10, including second threshold means connected to receive the output of one of the first and second detection means and to produce a fourth detection signal indicating whether or not the intensity of the radiation received by said one detector means is above a second predetermined intensity threshold which is lower than the first-mentioned predetermined intensity threshold, and in which the output means is connected to receive the fourth detection signal and is operative to produce the said control signal only when, simultaneously with the said conditions, the fourth detection signal indicates that the intensity of the radiation received by said one detection means exceeds the second predetermined intensity threshold.

12. A system according to claim 1 or 7, including means which is responsive to the first detection signal and operative to prevent the output means from producing the said control output for a predetermined length of time after the first detection signal has indicated that the said color temperature has remained above the predetermined threshold for at least a relatively shorter predetermined length of time.

13. A system according to claim 10, including means which is responsive to the first detection signal and operative to prevent the output means from producing the said control output for a predetermined length of time after the first detection signal has indicated that the said color temperature has remained above the predetermined threshold for at least a relatively shorter predetermined length of time.

* * * * *

UNITED STATES PATENT AND TRADEMARK OFFICE
CERTIFICATE OF CORRECTION

PATENT NO. : 4,421,984

DATED : December 20, 1983

INVENTOR(S) : Farquhar et al

It is certified that error appears in the above—identified patent and that said Letters Patent is hereby corrected as shown below:

The title "Fire and Explosion and Detection Suppression" is corrected to read ---Fire and Explosion Detection and Suppression---.

Signed and Sealed this

*Twenty-seventh* Day of *March 1984*

[SEAL]

*Attest:*

GERALD J. MOSSINGHOFF

*Attesting Officer* *Commissioner of Patents and Trademarks*